US010021831B2

(12) United States Patent
Ito et al.

(10) Patent No.: US 10,021,831 B2
(45) Date of Patent: Jul. 17, 2018

(54) ELECTRIC WORK VEHICLE

(71) Applicant: Kubota Corporation, Osaka-shi (JP)

(72) Inventors: Hirokazu Ito, Sakai (JP); Kazuo Koike, Sakai (JP)

(73) Assignee: Kubota Corporation, Osaka (JP)

( * ) Notice: Subject to any disclaimer, the term of this patent is extended or adjusted under 35 U.S.C. 154(b) by 102 days.

(21) Appl. No.: 14/944,830

(22) Filed: Nov. 18, 2015

(65) Prior Publication Data
US 2016/0288829 A1    Oct. 6, 2016

(30) Foreign Application Priority Data

Apr. 2, 2015  (JP) .................. 2015-076063

(51) Int. Cl.
| | |
|---|---|
| *B60K 1/04* | (2006.01) |
| *A01D 34/78* | (2006.01) |
| *A01D 34/64* | (2006.01) |
| *A01D 67/00* | (2006.01) |

(52) U.S. Cl.
CPC .............. *A01D 34/78* (2013.01); *A01D 34/64* (2013.01); *A01D 67/00* (2013.01); *Y02T 10/7258* (2013.01)

(58) Field of Classification Search
CPC ........ A01D 34/78; A01D 34/64; A01D 34/58; A01D 67/00; B60K 7/00; B60K 7/0007; B60K 2007/0038; B60K 2007/0046; B60K 2007/0061; B60K 2007/0092
See application file for complete search history.

(56) References Cited

U.S. PATENT DOCUMENTS

| | | | | |
|---|---|---|---|---|
| 5,921,338 A | * | 7/1999 | Edmondson | B60G 21/045 180/6.5 |
| 6,092,468 A | * | 7/2000 | Hase | B62D 11/04 104/305 |
| 6,698,313 B2 | * | 3/2004 | Gaffney | B60K 1/02 180/65.6 |
| 6,717,281 B1 | * | 4/2004 | Brandon | B60W 10/04 180/65.245 |
| 6,727,620 B2 | * | 4/2004 | White | B60K 7/0007 310/112 |
| 7,363,995 B2 | * | 4/2008 | Downs | B60K 7/0007 180/292 |
| 7,610,986 B2 | * | 11/2009 | Ohashi | A01D 34/80 180/305 |

(Continued)

FOREIGN PATENT DOCUMENTS

| | | |
|---|---|---|
| JP | 2011218951 A | 11/2011 |
| JP | 201318386 A | 1/2013 |

(Continued)

*Primary Examiner* — Jacob B Meyer
(74) *Attorney, Agent, or Firm* — The Webb Law Firm

(57) ABSTRACT

An electric work vehicle includes a casing structure connected to a vehicle frame and having a central casing, a left casing, and a right casing. The vehicle further includes a left rear wheel supported by the left casing, a right rear wheel supported by the right casing, a left motor housed in a left region of the central casing, a right motor housed in a right region of the central casing, a left transmission mechanism housed in the left casing for transmitting power from the left motor to the left rear wheel, and a right transmission mechanism housed in the right casing for transmitting power from the right motor to the right rear wheel.

10 Claims, 5 Drawing Sheets

(56) References Cited

U.S. PATENT DOCUMENTS

| | | | | |
|---|---|---|---|---|
| 7,635,039 | B2* | 12/2009 | Fujiwara | B60K 6/26 180/65.21 |
| 7,690,470 | B2* | 4/2010 | Iwaki | B60K 17/30 180/252 |
| 8,155,834 | B2* | 4/2012 | Murahashi | B60B 11/06 180/339 |
| 8,191,342 | B2* | 6/2012 | Ishii | A01D 34/44 56/11.9 |
| 8,428,818 | B2* | 4/2013 | Murahashi | B60B 11/06 180/339 |
| 8,541,915 | B2* | 9/2013 | Burns | H02K 5/20 310/54 |
| 8,640,812 | B2* | 2/2014 | Bindl | B60K 7/00 180/255 |
| 8,701,806 | B2* | 4/2014 | Ishii | A01D 34/66 180/312 |
| 9,132,723 | B2* | 9/2015 | Munster | B60K 7/0007 |
| 9,216,660 | B2* | 12/2015 | Takamura | B60L 11/1874 |
| 9,616,736 | B2* | 4/2017 | Ito | B60K 17/043 |
| 9,630,482 | B2* | 4/2017 | Raymond | B60K 17/14 |
| 2004/0112027 | A1* | 6/2004 | Komorida | A01D 43/0635 56/202 |
| 2009/0032321 | A1* | 2/2009 | Marsh | B60G 3/00 180/65.51 |
| 2010/0140020 | A1 | 6/2010 | Murahashi | |
| 2010/0187044 | A1* | 7/2010 | Nabeshima | B60B 11/06 184/26 |
| 2010/0236845 | A1* | 9/2010 | Ishii | A01D 34/66 180/65.6 |
| 2011/0247886 | A1 | 10/2011 | Sasahara et al. | |
| 2012/0103708 | A1* | 5/2012 | Hennings | B60K 7/0007 180/65.6 |
| 2013/0015005 | A1 | 1/2013 | Koga et al. | |
| 2015/0367720 | A1* | 12/2015 | Yukishima | B60K 7/0007 180/60 |
| 2016/0039277 | A1* | 2/2016 | Falls | B60K 1/02 180/62 |
| 2016/0068159 | A1* | 3/2016 | Zou | B60W 30/18027 701/22 |
| 2016/0288829 | A1* | 10/2016 | Ito | A01D 34/78 |
| 2016/0293906 | A1* | 10/2016 | Ito | A01D 34/64 |
| 2016/0297293 | A1* | 10/2016 | Ito | B60K 1/04 |
| 2017/0015185 | A1* | 1/2017 | Uranaka | B62D 21/11 |

FOREIGN PATENT DOCUMENTS

| | | |
|---|---|---|
| JP | 201321987 A | 2/2013 |
| WO | 2009016884 A | 2/2009 |
| WO | 2013015171 A1 | 1/2013 |

* cited by examiner

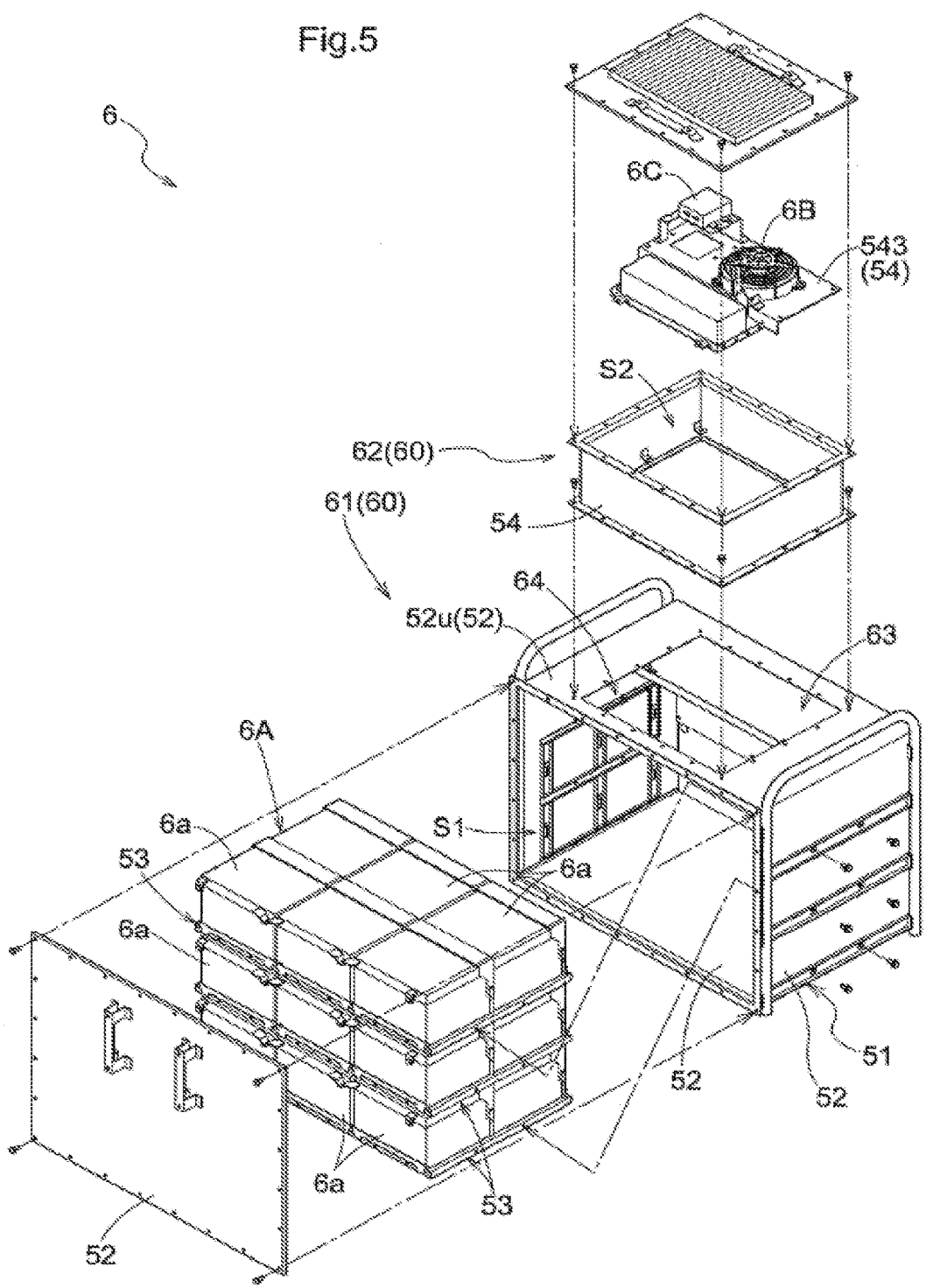

ELECTRIC WORK VEHICLE

CROSS REFERENCE TO RELATED APPLICATION

This application claims priority to Japanese Patent Application No. 2015-076063 filed Apr. 2, 2015, the disclosure which is hereby incorporated in its entirety by reference.

BACKGROUND OF THE INVENTION

Technical Filed of the Invention

The present invention relates to an electric work vehicle including a left electric motor for driving a left rear wheel, and a right electric motor for driving a right rear wheel.

Description of the Related Art

A conventional lawn mower is disclosed in International Publication No. WO 2013/015171 A1. This lawn mower includes a pair of right and left rear wheels independently driven by a pair of right and left motors. The pair of right and left rear wheels are supported by a rear-axle casing extending between the rear wheels. A gear casing extends from a central part of the rear-axle casing at right angles in an extending direction of the rear-axle casing. A left motor extends to the left from an end portion of the gear casing and a right motor extends to the right from the end portion of the gear casing in a transverse direction of the vehicle. Rotary power from each of the motors is transmitted to an axle housed in the rear-axle casing through a transmission mechanism housed in the gear casing. As apparent from FIG. 2 of the publication, the right and left motors extending straight in the transverse direction are connected to the rear-axle casing also extending straight in the transverse direction at their central positions via the gear casing extending in a fore-and-aft direction of the vehicle. Thus, the casing structure disclosed in this publication including the mechanism for transmitting power from the motors to the rear wheels has a significantly complicated configuration, which results in increased costs. Further, the right and left motors are individually supported by the cantilevered motor casings, which results in reduced strength.

SUMMARY OF INVENTION

Under the circumstances, a demand has been growing for improvement of the casing structure supporting the right and left motors.

An electric work vehicle according to the present invention includes a vehicle frame, and a casing structure connected to the vehicle frame and having a left casing, a right casing, and a central casing. The work vehicle further includes a left rear wheel supported by the left casing, a right rear wheel supported by the right casing, a left motor housed in a left region of the central casing, a right motor housed in a right region of the central casing, a left transmission mechanism housed in the left casing to transmit power from the left motor to the left rear wheel, and a right transmission mechanism housed in the right casing to transmit power from the right motor to the right rear wheel.

With the above arrangement including the right and left motors housed in the central casing of the casing structure, the central housing functions as a common motor housing for the right and left motors, which contributes to cost reduction for the motor housing. Further, the left casing and the right casing of the casing structure function as a housing for the left transmission mechanism and a housing for the right transmission mechanism, respectively. More particularly, the casing structure forms an integrated housing for accommodating the motors as well as the transmission mechanisms for transmitting power from the motors to the driving wheels, which increases the rigidity. As a result, the common housing for both the right and left motors has great strength as well.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 is an exploded perspective view of the battery pack according to one preferable embodiment.

DETAILED DESCRIPTION OF THE INVENTION

Figure 1:
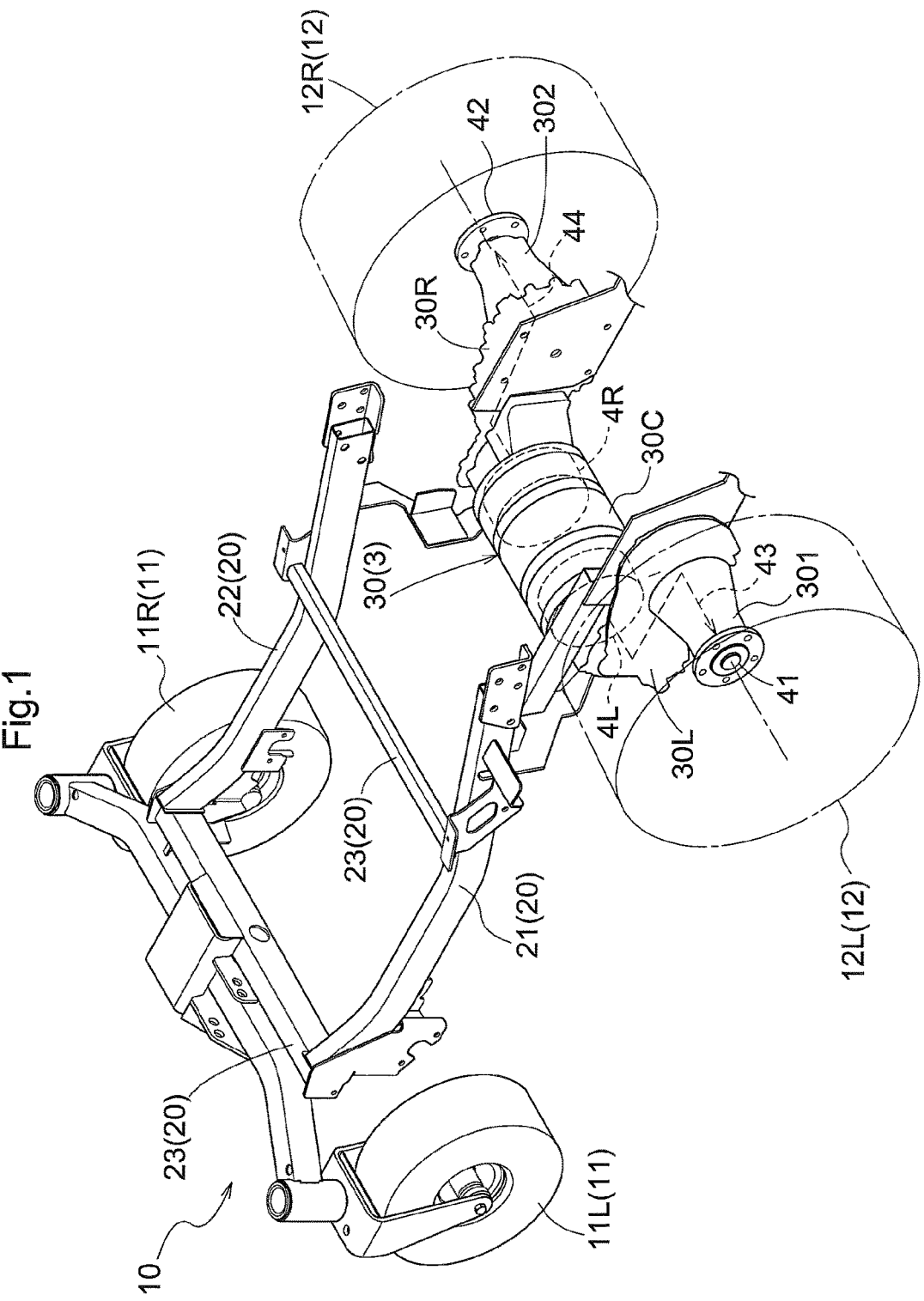
FIG. 1 is a perspective view of a driving unit mounted on an electric work vehicle for sketching a fundamental arrangement.

The particulars shown herein are by way of example and for the purposes of illustrative discussion of the embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Previous to detailed description of an electric work vehicle according to one specific embodiment of the present invention, a fundamental arrangement of a driving unit 3 mounted on the electric vehicle will be described first with reference to FIG. 1.

The electric work vehicle includes a vehicle body 10 having a vehicle frame 20 consisting mainly of a left frame 21 and a right frame 22 extending in a fore-and-aft direction of the vehicle body, and at least one cross beam 23 connecting the left frame 21 to the right frame 22. A left front wheel 11L and a right front wheel 11R are supported at a front part of the vehicle frame 20, and a left rear wheel 12L and a right rear wheel 12R are supported at a rear part of the vehicle frame 20 via the driving unit 3. The left front wheel 11L and the right front wheel 11R will be collectively referred to as front wheels 11, and the left rear wheel 12L and the right rear wheel 12R will be collectively referred to as rear wheels 12 hereinafter unless the need arises to distinguish the left from the right.

The driving unit 3 includes a casing structure 30 connected to the vehicle frame 20.

The casing structure 30 has a left casing 30L, a right casing 30R, and a central casing 30C which form a left part, a right part and a central part of the casing structure 30, respectively. The left rear wheel 12L is supported by the left casing 30L, and the right rear wheel 12R is supported by the right casing 30R. A left motor 4L is housed in a left region of the central casing 30C, and a right motor 4R is housed in a right region of the central casing 30C. A left transmission mechanism 43 for transmitting power from the left motor 4L to the left rear wheel 12L is housed in the left casing 30L, and a right transmission mechanism 44 for transmitting power from the right motor 4R to the right rear wheel 12R is housed in the right casing 30R. In FIG. 1, the left transmission mechanism 43 and the right transmission mechanism 44 are only represented in arrowed broken line to show flows of driving power. Each of the left transmission mechanism 43 and the right transmission mechanism 44 typically includes a gear pair, a chain and a transmission shaft.

The left frame 21 is connected to the left casing 30L, and the right frame 22 is connected to the right casing 30R. This arrangement allows the casing structure 30 to function as a cross beam of the vehicle frame 20, which increases the strength of the vehicle frame 20. As a result, no reinforcement frame is additionally required to support the right and left rear wheels in the vehicle frame 20.

Referring to FIG. 1, the central casing 30C extends in a transverse direction of the vehicle. The left casing 30L extends rearward from a left end of the central casing 30C in the fore-and-aft direction of the vehicle body, and the right casing 30R extends rearward from a right end of the central casing 30C in the fore-and-aft direction of the vehicle body. A left rear-axle casing 301 is mounted on the left side of a free end of the left casing 30L, and a right rear-axle casing 302 is mounted on the right side of a free end of the right casing 30R.

The central casing 30C has a substantially cylindrical shape and functions as a common motor housing for the left motor 4L and the right motor 4R. More particularly, an outer peripheral part of the left motor 4L and an outer peripheral part of the right motor 4R are attached to respective inner walls (inner circumferential surfaces) of the central casing 30C along its axial direction. This arrangement reduces the outer diameter of the central casing 30C compared with an arrangement in which the motors are accommodated in their respective housings.

Although not shown in FIG. 1, a common coolant channel for the left motor 4L and the right motor 4R may be formed in a circumferential wall of the central casing 30C. This simplifies the coolant channel even if two motors are mounted.

As apparent from FIG. 1, a space is defined by the central casing 30C, the left casing 30L and the right casing 30R as viewed from above. This space can accommodate a portion or the entirety of a battery pack for supplying power to the left motor 4L and the right motor 4R, which achieves good weight balance and compact arrangement of the work vehicle. Further, an implement motor for producing power for a work implement mounted on the electric work vehicle may be arranged within this space, which results in effective use of the space in addition to achieving good weight balance and compact arrangement of the work vehicle. For the same purposes, any other heavy device may be disposed in this space.

Figure 2:
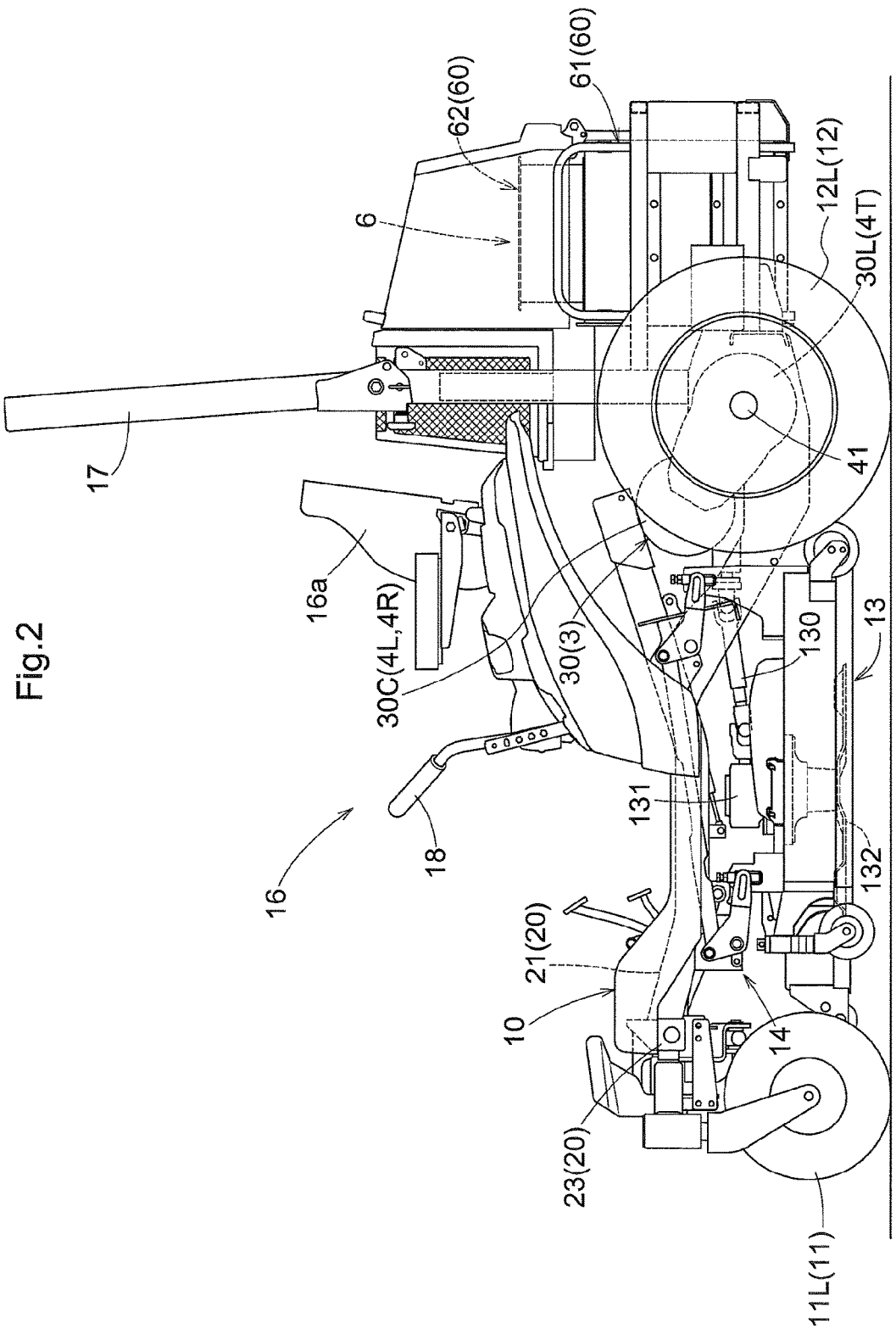
FIG. 2 is a side view of an electric lawn mower, which is an example of the electric work vehicle.
Figure 3:
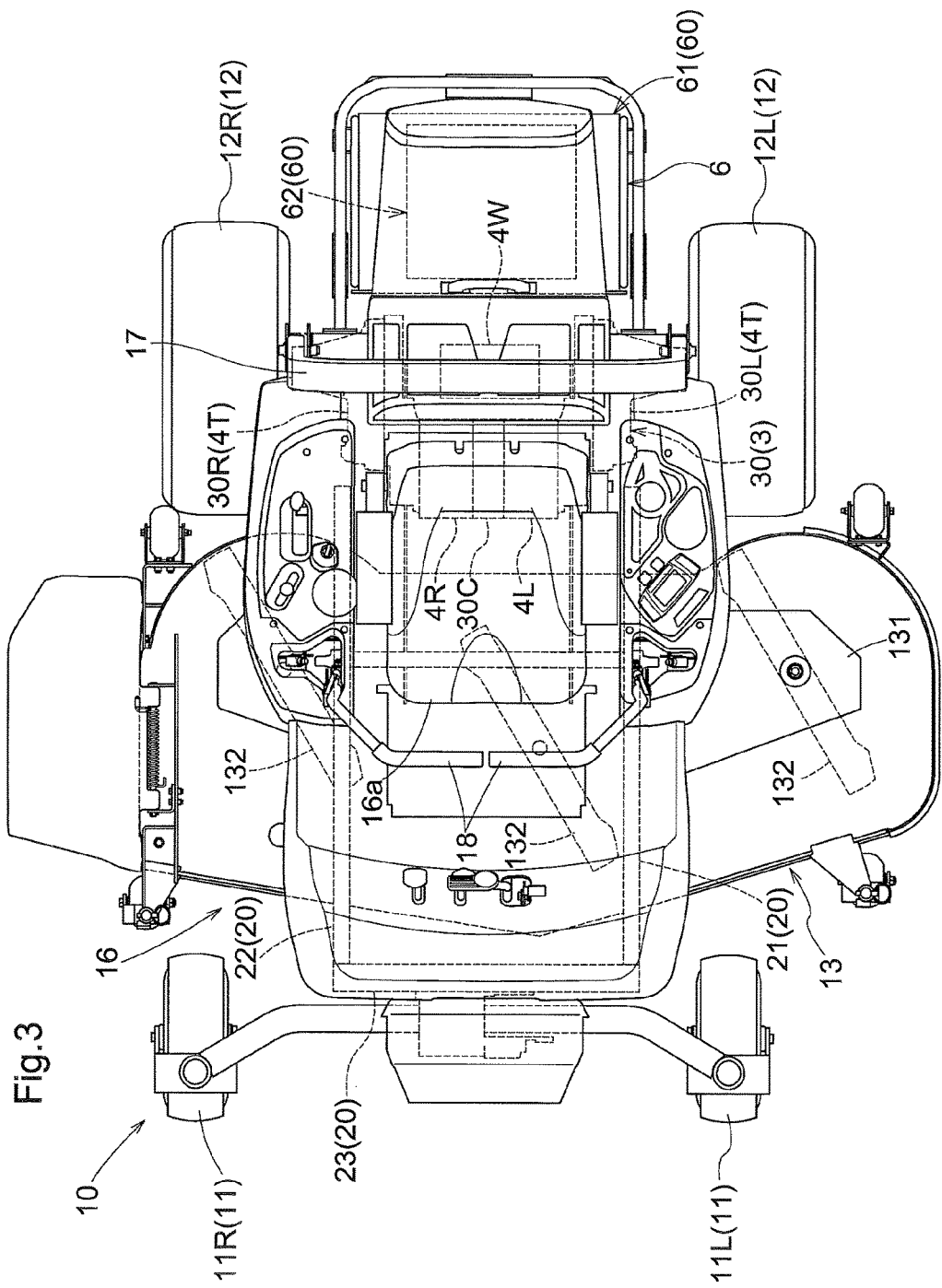
FIG. 3 is a top plan view of the electric lawn mower.
Figure 4:
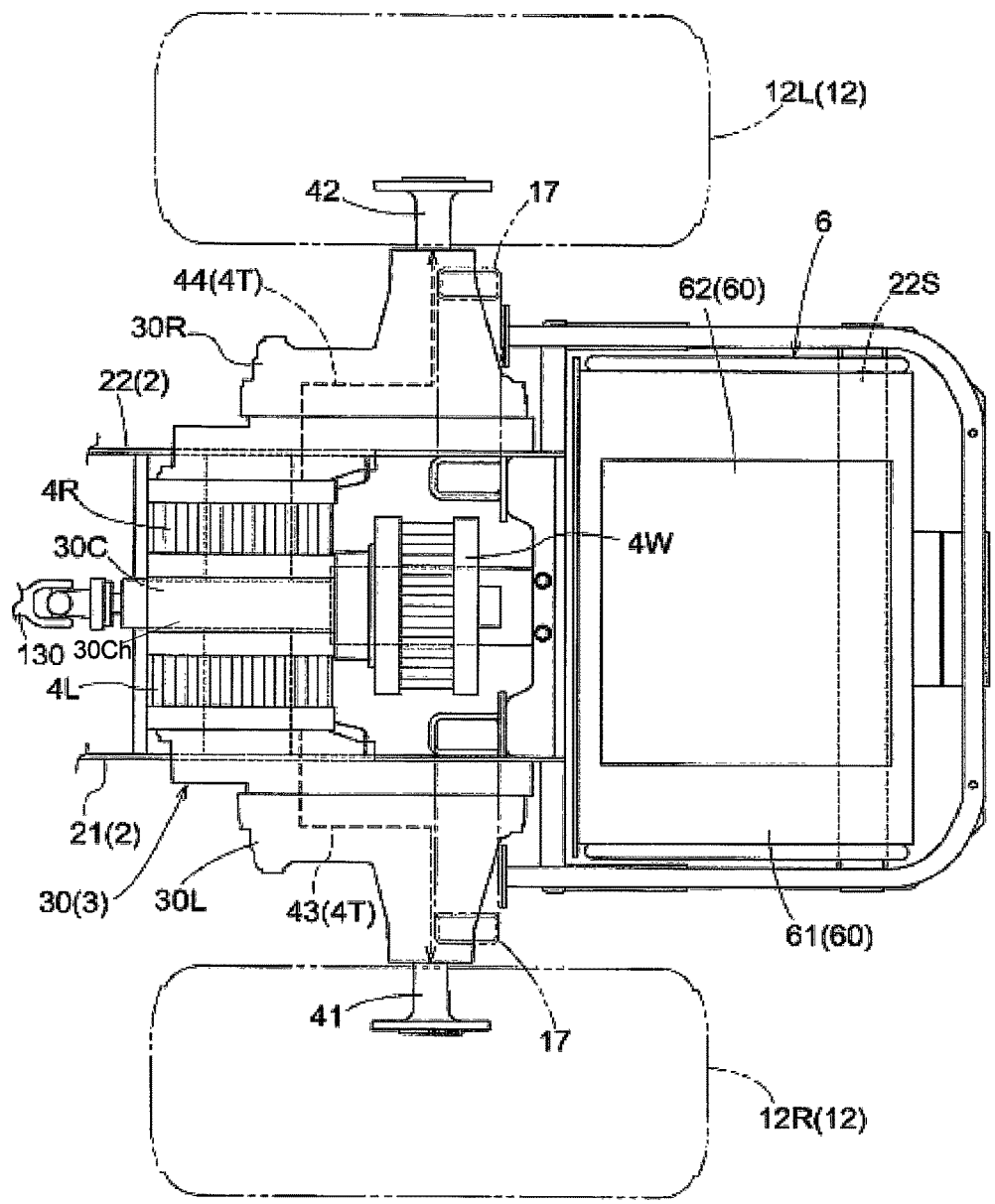
FIG. 4 is a top plan view of a battery pack and electric motors powered by the battery pack.

Next, the electric work vehicle according to a specific embodiment will be described with reference to FIGS. 2 to 4. FIG. 2 is a side view of an electric lawn mower, which is an example of the electric work vehicle, FIG. 3 is a top plan view of the electric lawn mower, and FIG. 4 is a top plan view of a rear part of the electric lawn mower. Referring to FIGS. 2 to 4, the electric lawn mower ("lawn mower" hereinafter) includes a vehicle body 10 supported on the ground by a pair of right and left front wheels 11 and a pair of right and left rear wheels 12 acting as driven wheels. The vehicle body 10 has a vehicle frame 20 acting as a base frame and including a left frame 21 and a right frame 22. A mower unit 13 is suspended from the vehicle frame 20 between the front wheels 11 and the rear wheels 12 via a link mechanism 14. The mower unit 13 includes a blade transmission mechanism 131 and blades 132 propelled by the blade transmission mechanism 131. An operator's section 16 is provided in a central region of the vehicle body 10 in the fore-and-aft direction of the vehicle. With this arrangement, a driver's seat 16a is mounted on the central region of the vehicle body 10 in the fore-and-aft direction via a seat support.

Referring to FIG. 4, a driving unit 3 is disposed between the left frame 21 and the right frame 22 at a rear end region of the vehicle frame 20. The driving unit 3 includes a casing structure 30. The casing structure 30 is gate shaped as viewed from above and includes a left casing 30L, a right casing 30R, and a central casing 30C connecting the left casing 30L to the right casing 30R. The left casing 30L and the right casing 30R extend rearward from the central casing 30C. A left rear-axle casing 301 supporting a left rear axle 41 is formed at an end region of the left casing 30L, and a right rear-axle casing 302 supporting a right rear axle 42 is formed at an end region of the right casing 30R. The casing structure 30 is connected to the left frame 21 and the right frame 22, and act as one of cross beams of the vehicle frame 20. The vehicle frame 20 has a rear part extending further rearward from the casing structure 30 to define a receiving surface 22S on which a battery pack 6 is placed.

The central casing 30C functions as a common housing for a left motor 4L for driving the left rear wheel 12, and a right motor 4R for driving the right rear wheel 12. In the present embodiment, the central casing 30C has a common coolant channel 30Ch for the left motor 4L and the right motor 4R. The coolant channel per se is well known in the art as a water jacket structure for cooling the electric vehicle motor, and thus is only schematically shown in broken line in FIG. 4. An electric pump is employed as a pump forming a cooling circuit including the coolant channel. Such an electric pump has a pump motor powered by the battery back 6. The pump P may be mounted on an internal or external side of the central casing 30C. Alternatively, the pump may be provided in any other location than the central casing 30C, and the coolant channel provided in the central casing 30C may be connected to the pump via a connecting conduit.

A transmission 4T includes a left transmission mechanism 43 for transmitting power from the left motor 4L to the left rear axle 41, and a right transmission mechanism 44 for transmitting power from the right motor 4R to the right rear axle 42. The left transmission mechanism 43 is housed in the left casing 30L and the right transmission mechanism 44 is housed in the right casing 30R. The structures of the left transmission mechanism 43 and the right transmission mechanism 44 are well known in the art, and thus only schematically shown in arrowed broken line in FIG. 4 to show flows of driving power. Each of the left transmission mechanism 43 and the right transmission mechanism 44 typically includes a gear pair, a chain and a transmission shaft.

The left motor 4L and the right motor 4R are independently and variably controlled. With such behavior, both the right and left rear wheels 12 are driven forward at substantially the same speed to produce straight forward speed, and both the right and left rear wheels 12 are driven reversely at substantially the same speed to produce straight reverse speed. Further, the right and left rear wheels 12 may be driven at different speeds to turn the vehicle body 10 in a desired direction. For example, while either one of the right and left rear wheels 12 is driven at low speed approximate to zero, the other of the right and left rear wheels 12 is driven forward or reversely at high speed to turn the vehicle with a short turning radius. Further, the right and left rear wheels 12 may be driven in opposite directions to allow the vehicle body 10 to spin-turn the vehicle around a center between the right and left wheels 12. The pair of right and left front wheels 11 are caster wheels that are freely rotatable about vertical axes, which change their positions in response to a running direction of the vehicle body driven by the rear wheels 12.

Referring to FIGS. 2 and 3, a pair of right and left shift levers 18 are provided on opposite sides of the driver's seat 16*a* to allow shifting operations for the left motor 4L and the right motor 4R. The continuously variable transmission is in a neutral stop position with the shift leters 18 being maintained at a longitudinal central position. A forward speed is produced with the shift leters 18 being operated forward from the neutral position, and a reverse speed is produced with the shift levers 18 being operated rearward from the neutral position.

A roll-over protective structure (ROPS) 17 is provided rearward of the operator's section 16. The ROPS 17 has an arched shape or inversed U-shape with a left free end being connected to the left frame 21 and the left casing 30L, and with a right free end being connected to the right frame 22 and the right casing 30R.

Referring to FIG. 4, an implement motor 4W for supplying power to a mower unit 13 acting as a work implement is arranged in a space defined by the central casing 30C, the left casing 30L and the right casing 30R. With reference to FIG. 2 as well, a PTO shaft 130 extends forward in the fore-and-aft direction of the vehicle. The PTO shaft 130 includes an output shaft and a relay shaft extending from the implement motor 4W to transmit power from the implement motor 4W to the blade transmission mechanism 131 of the mower unit 13.

Next, the battery pack 6 will be described hereinafter with reference to FIG. 5. While shown as disassembled in the drawings, the battery pack 6 is rectangular in basic configuration and mounted on the vehicle body 10 supported on the ground via the front wheels 11 and the rear wheels 12. While the mower unit 13 is arranged forward of the rear wheels 12 in the fore-and-aft direction, i.e., the running direction of the vehicle, the battery pack 6 is arranged rearward of the rear wheels 12 in the fore-and-aft direction. Such an arrangement provides good fore/aft weight balance of the vehicle.

The battery pack 6 includes a casing 60. The casing 60 accommodates a battery unit 6A, a circulation fan 6B, and a battery control unit 6C. The casing 60 includes a rectangular first casing 61 for housing the battery unit 6A, and a rectangular second casing 62 projecting from a top surface of the first casing 61 like a chimney.

The second casing 62 is smaller in size than the first casing 61. The first casing 61 has a first inner space S1 for accommodating the battery unit 6A, and the second casing 62 has a second inner space S2 for accommodating the circulation fan 6B and the battery control unit 6C. In this arrangement, a battery retainer framework 51 provides a build of the casing 60. The battery unit 6A includes a plurality of battery modules 6*a*, three multiplied by three, i.e., nine modules all told, in the present embodiment, and is supported by the battery retainer framework 51. The three battery modules 61 in each tier are integrated by a pack assembly frame 53. External surfaces of the battery retainer framework 51 are covered with panels 52 to produce the closed first inner space S1. The battery modules 6*a* include a plurality of battery cells (e.g. lithium-ion battery cells) which are charged and powered by the battery control unit 6C.

The first inner space S1 is similar to the battery unit 6A in shape, but somewhat larger than the battery unit 6A. For example, a narrow gap in the order of several millimeters to several centimeters is formed between the inner surface of the first casing 61 and the outer surface of the battery unit 6A. A fan opening 63 and a return opening 64 are formed in a boundary between the first casing 61 and the second casing 62. While the first inner space S1 communicates with the second inner space S2 via the fan opening 63 and the return opening 64, both the first inner space S1 and the second inner space S2 are tight closed to the outside to the extent to prevent entry of ambient air, glass clippings or debris of paper. The circulation fan 6B is arranged to allow cooling air produced by the circulation fan 6B to flow into the first inner space S1 via the fan opening 63.

The return opening 64 allows the first inner space S1 to communicate with the second inner space S2 and is disposed opposite the fan opening 63. The direct communication between the return opening 64 and the fan opening 63 is prevented by an unillustrated partition.

The retainer framework 51 includes an upper framework 54 having a receiving plate 543 substantially acting as a bottom plate. The battery control unit 6C and the circulation fan 6B are placed on the receiving plate 543. The circulation fan 6B is an axial flow fan with its blow-off side being oriented to the fan opening 63 on the receiving plate 543 to draw air from the above and blow it off downward as cooling air. The cooling air from the circulation fan 6B passes through the fan opening 63 and the second inner space S2 to the first inner space S1.

The return opening 64 is formed in the receiving plate 543 as a through hole, in addition to the fan opening 63, around the battery control unit 6C. The cooling air directed to the first inner space S1 returns to the second inner space S2 through the return opening 64. The cooling air having entered the second inner space S2 is drawn by the circulation fan 6B to flow toward the blow-off side of the circulation fan 6B and cool components of the battery control unit 6C.

Alternative Embodiments

1. In the above embodiment, the central casing 30C has a substantially cylindrical shape. Instead, it may have an exact cylindrical shape, a polygonal tubular shape, or a heteromorphic tubular shape.

2. In the above embodiment, the battery unit 6A includes nine battery modules 6*a*, three by three. However, the number of battery modules 6*a* is not limited to nine. Further, the battery modules 6*a* may be arranged in any other way with any other number of tiers and/or rows.

3. In the above embodiment, the rear wheels 12 are driving wheels. Instead, the front wheels 11 may be driving wheels, or both the front wheels 11 and the rear wheels 12 may be driving wheels. In any case, the central casing 30C of the casing structure 30 houses both the left motor 4L for the left wheel(s) and the right motor 4R for the right wheel(s).

4. In the above embodiment, the lawn mower is described as an example of the electric work vehicle. Instead, the electric work vehicle may be agricultural work vehicles such as a rice transplanter, a combine harvester or a tractor, or construction machines such as a backhoe or a bucket loader.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is applicable to electric work vehicles including a left electric motor for driving a left rear wheel, and a right electric motor for driving a right rear wheel.

What is claimed is:

1. An electric work vehicle comprising:
a vehicle frame;
a casing structure connected to the vehicle frame, and including a left casing, a right casing, and a central casing;
a left rear wheel supported by the left casing;
a right rear wheel supported by the right casing;
a left motor housed in a left region of the central casing;
a right motor housed in a right region of the central casing;
a left transmission mechanism housed in the left casing to transmit power from the left motor to the left rear wheel; and
a right transmission mechanism housed in the right casing to transmit power from the right motor to the right rear wheel,
wherein the central casing extends in a transverse direction of the vehicle, the left casing extends rearward in a fore-and-aft direction of the vehicle from a left end of the central casing, the right casing extends rearward in the fore-and-aft direction of the vehicle from a right end of the central casing, and
wherein the work vehicle further comprises a left rear-axle casing mounted on a left side of the left casing and extending between the left casing and an outer surface of the left rear wheel, and a right rear-axle casing mounted on a right side of the right casing and extending between the right casing and an outer surface of the right rear wheel.

2. The electric work vehicle according to claim 1,
wherein the vehicle frame includes a left frame and a right frame, both of which extend in the fore-and-aft direction of the vehicle, and at least one cross beam connecting the left frame to the right frame, and
wherein the left frame is connected to the left casing, and the right frame is connected to the right casing.

3. The electric work vehicle according to claim 1, wherein the central casing has a cylindrical shape and acts as a common housing for the left motor and the right motor.

4. An electric work vehicle comprising:
a vehicle frame;
a casing structure connected to the vehicle frame, and including a left casing, a right casing, and a central casing;
a left rear wheel supported by the left casing;
a right rear wheel supported by the right casing;
a left motor housed in a left region of the central casing;
a right motor housed in a right region of the central casing;
a left transmission mechanism housed in the left casing to transmit power from the left motor to the left rear wheel;
a right transmission mechanism housed in the right casing to transmit power from the right motor to the right rear wheel,
a left rear-axle casing mounted on a left side of the left casing; and
a right rear-axle casing mounted on a right side of the right casing,
wherein the central casing has a common coolant channel for the left motor and the right motor.

5. An electric work vehicle comprising:
a vehicle frame;
a casing structure connected to the vehicle frame, and including a left casing, a right casing, and a central casing;
a left rear wheel supported by the left casing;
a right rear wheel supported by the right casing;
a left motor housed in a left region of the central casing;
a right motor housed in a right region of the central casing;
a left transmission mechanism housed in the left casing to transmit power from the left motor to the left rear wheel;
a right transmission mechanism housed in the right casing to transmit power from the right motor to the right rear wheel, and
an implement motor for driving a work implement arranged in a space defined by the central casing, the left casing and the right casing.

6. An electric work vehicle comprising:
a vehicle frame;
a casing structure connected to the vehicle frame, and including a left casing, a right casing, and a central casing;
a left rear wheel supported by the left casing;
a right rear wheel supported by the right casing;
a left motor housed in a left region of the central casing;
a right motor housed in a right region of the central casing;
a left transmission mechanism housed in the left casing to transmit power from the left motor to the left rear wheel; and
a right transmission mechanism housed in the right casing to transmit power from the right motor to the right rear wheel,
wherein the central casing extends in a transverse direction of the vehicle, the left casing mounted to the central casing and extends rearward of the central casing in a fore-and-aft direction of the vehicle from a left end of the central casing, the right casing mounted to the central casing and extends rearward of the central casing in the fore-and-aft direction of the vehicle from a right end of the central casing, and
wherein the work vehicle further comprises a left rear-axle casing mounted to a left side of the left casing, and a right rear-axle casing mounted to a right side of the right casing.

7. The electric work vehicle according to claim 6,
wherein the vehicle frame includes a left frame and a right frame, both of which extend in the fore-and-aft direction of the vehicle, and at least one cross beam connecting the left frame to the right frame, and
wherein the left frame is connected to the left casing, and the right frame is connected to the right casing.

8. The electric work vehicle according to claim 6, wherein the central casing has a cylindrical shape and acts as a common housing for the left motor and the right motor.

9. An electric work vehicle comprising:
a vehicle frame;
a casing structure connected to the vehicle frame, and including a left casing, a right casing, and a central casing;
a left rear wheel supported by the left casing;
a right rear wheel supported by the right casing;
a left motor housed in a left region of the central casing;
a right motor housed in a right region of the central casing;
a left transmission mechanism housed in the left casing to transmit power from the left motor to the left rear wheel; and
a right transmission mechanism housed in the right casing to transmit power from the right motor to the right rear wheel,
wherein the central casing extends in a transverse direction of the vehicle, the left casing mounted to the central casing and extends rearward of the central casing in a fore-and-aft direction of the vehicle from a left end of the central casing, the right casing mounted to the central casing and extends rearward of the central casing in the fore-and-aft direction of the vehicle from a right end of the central casing,
wherein the central casing has a common coolant channel for the left motor and the right motor.

10. An electric work vehicle comprising:
a vehicle frame;
a casing structure connected to the vehicle frame, and including a left casing, a right casing, and a central casing;
a left rear wheel supported by the left casing;
a right rear wheel supported by the right casing;
a left motor housed in a left region of the central casing;
a right motor housed in a right region of the central casing;
a left transmission mechanism housed in the left casing to transmit power from the left motor to the left rear wheel;
a right transmission mechanism housed in the right casing to transmit power from the right motor to the right rear wheel, and
an implement motor for driving a work implement arranged in a space defined by the central casing, the left casing and the right casing,
wherein the central casing extends in a transverse direction of the vehicle, the left casing mounted to the central casing and extends rearward of the central casing in a fore-and-aft direction of the vehicle from a left end of the central casing, the right casing mounted to the central casing and extends rearward of the central casing in the fore-and-aft direction of the vehicle from a right end of the central casing.

* * * * *